May 20, 1924.
A. STUBER ET AL
PHOTOGRAPHIC ROLL HOLDER
Filed Oct. 20, 1923
1,494,719
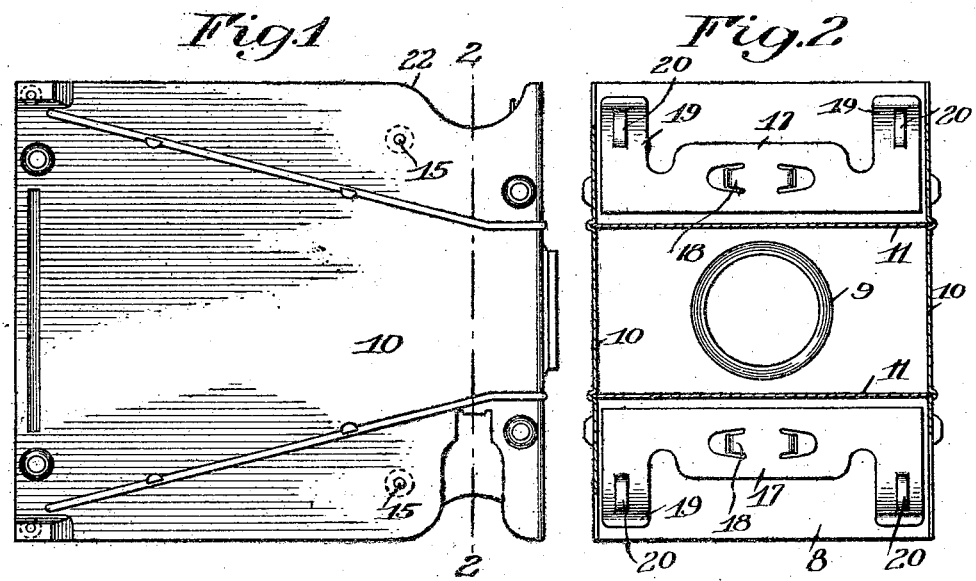
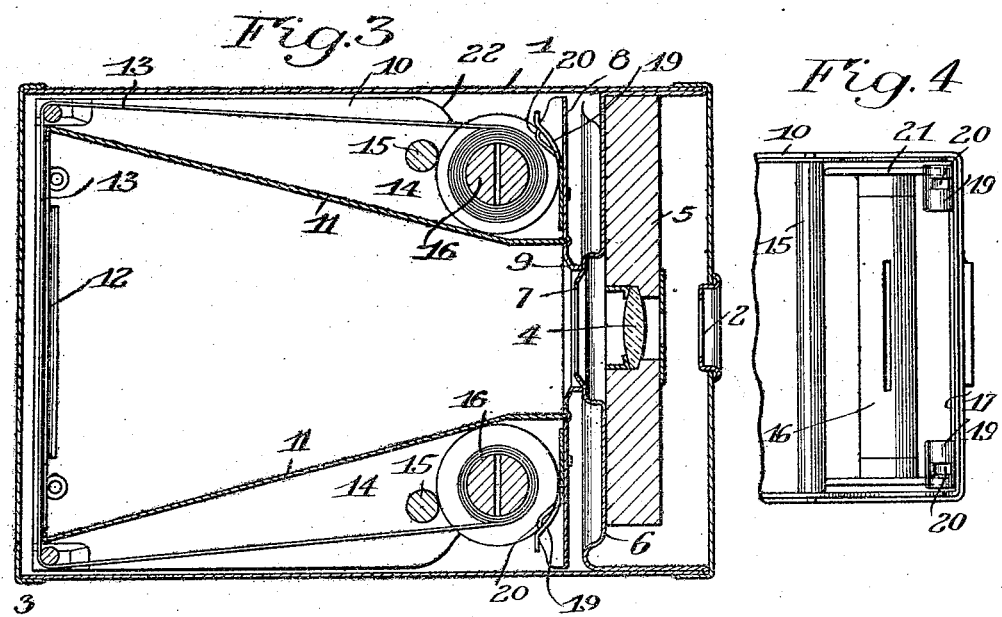
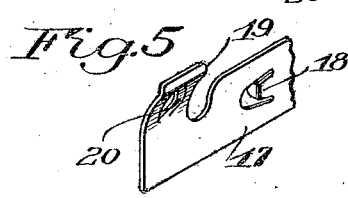
INVENTORS
Adolph Stuber
Ernest E. Underwood
BY
Frederick S. Church
their ATTORNEY Patented May 20, 1924.

1,494,719

UNITED STATES PATENT OFFICE.

ADOLPH STUBER AND ERNEST E. UNDERWOOD, OF ROCHESTER, NEW YORK, ASSIGNORS TO EASTMAN KODAK COMPANY, OF ROCHESTER, NEW YORK, A CORPORATION OF NEW YORK.

PHOTOGRAPHIC-ROLL HOLDER.

Application filed October 20, 1923. Serial No. 669,842.

*To all whom it may concern:*

Be it known that we, ADOLPH STUBER and ERNEST E. UNDERWOOD, both citizens of the United States, residing at Rochester, in the county of Monroe and State of New York, have invented certain new and useful Improvements in Photographic-Roll Holders; and we do hereby declare the following to be a full, clear, and exact description of the same, reference being had to the accompanying drawings, forming a part of this specification, and to the reference numerals marked thereon.

Our present invention relates to photography and more particularly to photographic cameras and to roll holders therefor and it has for its object to provide a simple and convenient but inexpensive means for holding a film roll under tension while in a roll holder. The improvements are directed in part producing a device that will work with certainty and uniformity while the film roll is decreasing in diameter or whatever its size. To these and other ends the invention resides in certain improvements and combinations of parts all as will be hereinafter more fully described the novel features being pointed out in the claims at the end of the specification.

In the drawings:

Figure 1 is a side view of a roll holder constructed in accordance with and illustrating one embodiment of our invention.

Figure 2 is a section on the line 2—2 of Figure 1.

Figure 3 is a longitudinal central sectional view through a camera fitted with the roll holder.

Figure 4 is a fragmentary top view of one of the film chambers in the roll holder and Figure 5 is a perspective view of a fragment of one of the film tensioning devices.

Similar reference numerals throughout the several views indicate the same parts.

The camera that we have illustrated in the present instance is a box camera comprising a body 1 having a lens opening 2 at the front and a detachable back 3. In rear of the lens opening is a lens 4 mounted on a block 5 on a partition plate 6 having an opening 7 in alignment with the lens.

The roll holder consists in the present instance of an all metal frame work that may be inserted and removed through the back 3.
It embodies a front plate 8 having an opening 9 cooperating with the opening 7 and side plates 10 fitting the interior of the camera box quite closely. Between the side plates 10 are relatively transverse top and bottom plates 11 that converge toward the front of the camera narrowing down to a degree of separation little greater than the diameter of the opening 9. At the rear, they form an exposure opening 12 past which a film 13 is guided in the focal plane in the usual manner.

The convergence of the interior plates 11 forms, on opposite sides of the roll holder, chambers 14 that progressively increase in depth in a forward direction, the side and front walls thereof being constituted by the walls 8 and 10. When the roll holder is in place in the camera, the outer walls of the chamber are constituted by the walls of the body so that the chambers are completely enclosed but become accessible upon withdrawing the roll holder from the camera. Transverse rollers 15 extending across the chambers 14 are so spaced from the front walls 8 that these two elements are adapted to closely confine between them the film spools 16 from one to the other of which the film 13 is wound in the ordinary manner. The rollers 15 are placed above the centers of the spools so that as the winding strain is placed upon them they will keep to the bottoms of the film chambers and not show a tendency to ride out.

In the practice of our invention we provide a tensioning device for the film rolls to prevent them from overthrowing. These are usually so made that they bear upon the film roll itself and as the roll decreases in size their effect is progressively lessened. With our improvements the pressure is transferred from the roll to the spool itself after the diameter of the roll has decreased a little and thus an even tension is maintained after the roll has become diminished. To these ends we fasten to each front wall 8 of the film chambers a spring plate 17, in the present instance, by means of ears 18 thereon clinched through slots in the walls. The two arms 19 of the plate extend transversely and are curved in that direction to approximate the curvature of the film roll. At the center of each a rounded abutment strap 20 of reentrant curvature is struck out.

The flanges 21 of the spools ride against the arms 19 on the outer sides of these abutment straps so that endwise thrust of the spools is prevented and positive centering devices are not required as shown in Figure 4. When the spool is full or the roll thereon is of maximum diameter, the straps bear directly but after the first few convolutions have been turned off the arms 19 bear directly against the edges of the spool flanges as shown in Figure 4 and the spring continues to operate without losing any of its effectiveness through fouling the receding surface of the roll.

An advantage of having the tensioning device preliminarily engage the roll directly is found in loading the camera and threading the film as the straps 20 hold the convolutions down tight while the lead end is being manipulated.

The side walls 10 of the film chambers at the ends of the spools are cut away at 22 to give finger room during the insertion or removal of the spools which are merely dropped in in front of the rollers 15 while the springs yield.

We claim as our invention:

1. In a photographic roll holder, the combination with a film chamber having means for rotatably supporting a flanged film spool, of a spring tensioning device having a portion adapted to engage the film roll directly and a portion adapted to engage a flange of the spool on which such film is wound.

2. In a photographic roll holder, the combination with a film chamber having means for rotatably supporting a flanged film spool, of a spring tensioning device adapted to frictionally engage the flanges of a spool in the holder and having abutments thereon cooperating with the flanges to prevent endwise movement of the spool.

3. In a photographic roll holder, the combination with a film chamber having means for rotatably supporting a flanged film spool, of a spring tensioning device embodying transverse arms adapted to frictionally engage the flanges of a spool in the chamber and provided with projecting portions adapted to bear on the film when fully wound upon the spool and to also cooperate with the spool flanges to prevent endwise movement thereof.

ADOLPH STUBER.
ERNEST E. UNDERWOOD.